United States Patent

[11] 3,576,542

[72] Inventor Thomas D. Floyd
North Palm Beach, Fla.
[21] Appl. No. 711,618
[22] Filed Mar. 8, 1968
[45] Patented Apr. 27, 1971
[73] Assignee RCA Corporation

[54] PRIORITY CIRCUIT
4 Claims, 1 Drawing Fig.

[52] U.S. Cl. ........ 340/172.5
[51] Int. Cl. ........ G06f 9/18
[50] Field of Search ........ 340/172.5; 235/157

[56] References Cited
UNITED STATES PATENTS

| | | | |
|---|---|---|---|
| 3,239,819 | 3/1966 | Masters | 340/172.5 |
| 3,289,168 | 11/1966 | Walton et al. | 340/172.5 |
| 3,331,055 | 7/1967 | Betz et al. | 340/172.5 |
| 3,377,579 | 4/1968 | Wissick et al. | 340/172.5 |
| 3,395,394 | 7/1968 | Cottrell, Jr. | 340/172.5 |

*Primary Examiner*—Gareth D. Shaw
*Assistant Examiner*—Sydney Chirlin
*Attorney*—H. Christoffersen

ABSTRACT: A register, the stages of which are adapted to be set by request for service signals of different priority. Within a first time interval after any stage is set, the lines carrying the request for service signals automatically are disconnected from the respective stages of the register. Within a second time interval, all except one stage of the register automatically are reset, that one stage corresponding to the one of the request for service signals of highest priority.

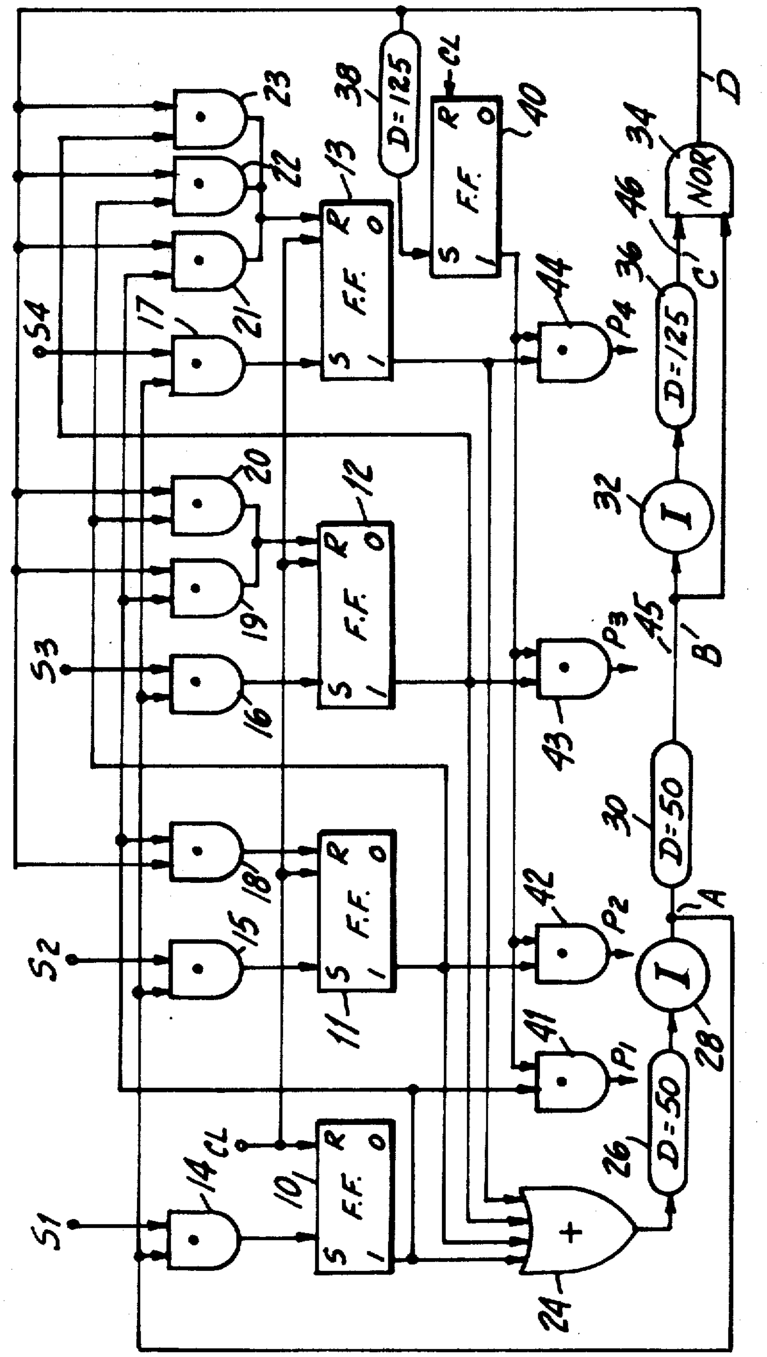
inventor
Thomas D. Floyd
By [signature]
Attorney

PRIORITY CIRCUIT

BACKGROUND OF THE INVENTION

The requests for service from, for example, different peripheral equipments to the processor of a digital computer system, may correspond to different "control states" of the System, and in each such state the processor may perform a different set of operations. The problem a priority circuit solves in this environment is the selection of the proper control state when a number of requests for service occur at the same time.

The problem above is usually handled in one of two different ways. In the first, a free running scanner is employed sequentially to sample the request for service signals in the order of their priority. As soon as a request for service signal is detected, the appropriate control state is selected to the exclusion of others, for the time required to complete the set of operations called for by that request for service signal.

A second solution to the problem involves the use of a double-rank register. A free running clock may be employed concurrently to prime a group of gate circuits to the respective ones of which the request for service signals are applied. When any such signal is present concurrently with a clock pulse, it passes through a gate and sets z flip-flop in the upper rank of the register. Thereafter, the set stage or stages in the upper rank of the register are employed to set a particular stage in the lower rank of the register. A decoder is employed to determine from the set stage or stages in the first rank, the particular stage of the second register which is to be set.

The present invention solves the problem discussed above with a relatively simple circuit which does not employ a free running clock, a scanner, or a double-rank register. In addition, as contrasted to the solutions discussed above in which there are periods of time during which the priority circuit is unable to sense for the presence of new request for service signals, (for example, in the case of the double-rank register, the periods during which the clock pulses are absent) in the circuit of the present invention, during the corresponding times, there are no "blind periods."

SUMMARY OF THE INVENTION

The circuit of the invention includes *n* lines, each for a different request for service signal and an *n* stage register, each stage coupled to a different line. In response to the presence of a request for service signal on a line, the register stage coupled to that line becomes set and stores that signal. In response to any set stage in a register, all lines are disconnected from the register and the register stages, except the one storing the request for service signal of highest priority, are reset.

BRIEF DESCRIPTION OF THE DRAWING

The single FIGURE of the drawing is a block circuit diagram of a priority circuit according to the invention.

DETAILED DESCRIPTION

The priority circuit of the invention includes a four stage register consisting of flip-flops 10—13. The convention is adopted that when a flip-flop is set by applying a signal manifesting the binary digit 1 to its set (S) terminal, a 1 appears at its 1 output terminal and 0 at its 0 output terminal and when a flip-flop is reset by applying a 1 to its reset (R) terminal, a 1 appears at its 0 output terminal and an 0 at its 1 output terminal. Input AND gates 14—17 are connected to the set terminals of the respective stages and input AND gates 18—23 are connected, as shown, to the reset terminals of the register stages 11—13.

The 1 output terminals of the register stages are connected through an OR gate 24 and delay line 26 to an inverter 28. The number 50 within the delay line indicates the delay inserted by the delay line, namely 50 nanoseconds. The output of inverter 28 is applied through delay line 30 to both inverter 32 and to one input terminal of NOR gate 34. The output of inverter 32 is applied through delay line 36 to the other input terminal of NOR gate 34. The output of NOR gate 34 is applied through delay line 38 to the set terminal of flip-flop 40.

AND gates 41—44 are the output AND gates of the register and are connected to the 1 output terminals of the respective flip-flops. The 1 output terminal of flip-flop 10 is also connected to AND gates 18, 19 and 21, which connect to the reset terminals of flip-flops 11, 12 and 13, respectively. In a similar manner, the 1 output terminal of flip-flop 11 is connected to AND gates 20 and 22 and the 1 output terminal of flip-flop 12 is connected to AND gate 23. The output of NOR gate 34 is applied as a second input to each of the AND gates 18—23, and the output of inverter 28 is applied to the AND gates 14—17.

In the operation of the circuit of the FIGURE, assume first that only the single request for service signal S1 is present of the four request for service signals S1, S2, S3, S4, of successively decreasing priority. As AND gate 14 is primed by the A=1 signal which is present, AND gate 14 becomes enabled and sets flip-flop 10.

When flip-flop 10 is set, the 1 present at its 1 output terminal primes AND gates 18, 19 and 21 which lead to the reset terminals of flip-flops 11, 12 and 13, respectively. This 1 also passes through OR gate 24 and, after the 50 nanosecond delay inserted by delay line 26, is applied to the inverter 28. The output A of the inverter thereupon changes from 1 to 0 and this 0 disables input AND gates 14, 15, 16 and 17. This effectively disconnects the lines carrying the request for service signals S1 through S4 from the respective flip-flops of the register.

After an additional 50 nanoseconds inserted by delay line 30, a B=0 signal appears on line 45. There is already present a C=0 signal at line 46 so that NOR gate 34 becomes enabled and produces an output D=1. This output has a duration equal to that of the delay inserted by delay line 36, that is, a duration of 125 nanoseconds.

The D=1 signal is applied to all of the AND gates leading to reset terminals of the flip-flops of the register. Of these AND gates, gates 18, 19 and 21 are primed so that they become enabled and apply reset signals to their flip-flops 11, 12 and 13. In this particular case, the flip-flops already are reset so that these signals have no effect.

After an additional 125 nanosecond delay inserted by delay line 38, the D=1 signal sets the flip-flop 40. This flip-flop primes the output AND gates 41—44. Now AND gate 41 becomes enabled since flip-flop 10 is set and P1 changes from 0 to 1. Flip-flops 11—13 are reset so that their output AND gates 42—44, respectively, remain disabled and P2, P3 and P4 remain equal to 0.

The P1=1 signal initiates a set of operations and, after they are completed, the clear signal CL is generated. It is applied to the reset terminals of all flip-flops and the circuit is then again ready to act on additional request for service.

To give a second example of the operation of the circuit, assume that S2=1, S3=1 and S1 and S4 are both equal to 0. The requests for service signals S2 and S3 set their respective flip-flops 11 and 12. After 50 nanoseconds, A changes to 0 and the input AND gates 14—17 become disabled. After an additional 50 nanoseconds, D changes to 1, priming the AND gates leading to the reset terminals of flip-flops 11—13. AND gate 18 remains disabled as flip-flop 10 is reset. However, AND gate 20 becomes enabled as do AND gates 22 and 23 and therefore flip-flop 12 becomes reset and flip-flop 13, which is already reset, remains reset.

Shortly thereafter, flip-flop 40 becomes set by the D=1 signal and the output AND gates 41—44 become primed. As flip-flop 11 is now the only one which remains set, only AND gate 42 becomes enabled and P2 changes to 1. P1, P3 and P4 remain equal to 0.

Summarizing the above, in response to the presence of two requests for service, S2 and S3, the circuit of the present application grants control to the signal S2 of higher priority to the exclusion of the lower priority signal S3. If, after the completion of the set of operations called for by S2 and the generation of signal CL, the signal S2 terminates, the signal S1 is absent and the signal S3 is still present, the circuit automatically will grant priority to the signal S3.

While the invention is illustrated in terms of four requests for service signals, S1—S4, it is to be understood that the invention is applicable to smaller or larger numbers of requests for service signals. It is also to be understood that while the gates shown are for the most part AND gates, other gates such as NOR gates may be employed instead, provided appropriate signal values are chosen. It is also to be understood that the delay means such as 26 and 30 may, if desired, include active elements, such as transistors for increasing the amplitude of the signals passing through these lines to appropriate signal levels.

The specific values of delays given are those actually employed in a particular design, however, these values are given by way of example only and are not intended to be limiting. For example, the delay inserted by delay means 26 should be sufficient to prevent the input gates 14—17 from becoming disabled, before an S signal applied to one or more of the gates has set the flip-flop or flip-flops connected to the gate or gates. If the flip-flops and gates are relatively slow, the delay inserted at 26 should be relatively long, and if they are relatively fast, the delay inserted at 26 may be relatively short. Similar considerations determine the actual delay values chosen for the other delay means illustrated.

I claim:

1. A circuit for granting priority to one of *n* request for service signals of different priorities, where *n* is an integer greater than 1, comprising, in combination:
*n* lines, each for a different request for service signal;
an *n* stage register, each stage coupled to a different line;
means responsive to the presence of a request for service signal on a line for setting the register stage coupled to that line to thereby store that signal;
means responsive to any set stage of said register for disconnecting all of said lines from said register;
means responsive to any set stage in said register which is storing a request for service signal of given priority for resetting any other stage in the register which is storing a request for service signal of lower priority; and
said means for disconnecting all of said lines from said register including a plurality of input gates, one for each register stage, each connected between a line and its register stage, and means responsive to any set stage of said register for disabling all of said input gates.

2. A circuit as set forth in claim 1, wherein each stage of the register includes a reset terminal and wherein said means for resetting any other stage of claim 1 includes:
gates connected to said reset terminals;
means responsive to a set stage of said register for priming a gate connected to a reset terminal, at each stage for storing a request for service signal of lower priority than said set stage of said register; and
means, including delay means, responsive to a set stage of a register for enabling said primed gates and thereby causing said gates to apply reset signals to their respective stages.

3. A circuit for granting priority to one of *n* request for service signals of different priorities, where *n* is an integer greater than 1, comprising, in combination:
*n* lines, each for a different request for service signal;
an *n* stage register, each stage comprising a flip-flop having a set and a reset terminal, each stage for storing a signal of different priority;
*n* normally primed gates coupling said *n* input lines to the respective set terminals of said flip-flops, whereby in response to the presence of a request for service signal on any line, the input gate to that line becomes enabled and applies a set signal to its flip-flop;
*n*–1 reset gate means, each such means including at least one reset gate, one reset gate means for each flip-flop other than the flip-flop for storing the request for service signal of highest priority, each such gate means coupled to the reset terminal of a different flip-flop;
means responsive to any set flip-flop of said register for priming a reset gate for each flip-flop of said register for storing a signal of lower priority than said set flip-flop;
means responsive to any set flip-flop of said register for producing a disabling signal after a first delay interval $\Delta t_1$ and applying it to all input gates to said set terminals of said flip-flops; and
means responsive to said disabling signal for producing a reset signal after an additional delay interval $\Delta t_2$ and for applying that reset signal to all of said reset gate means, whereby when there is more than one flip-flop which is set, all except one of these flip-flops become reset, the flip-flop remaining set being the one storing the request for service signal of highest priority in the more than one previously set flip-flops.

4. A circuit as set forth in claim 3, further including:
*n* output gates each connected to a different flip-flop; and
means responsive to said disabling signal for producing a priming signal after an additional delay interval $\Delta t_3$ and for applying that priming signal to all of said output gates, whereby the one flip-flop which is set enables its output gate, and all of the remaining output gates, while primed, are disabled by the reset flip-flops connected to these gates.